(12) United States Patent
Vadali et al.

(10) Patent No.: US 11,225,834 B2
(45) Date of Patent: Jan. 18, 2022

(54) SYSTEMS AND METHODS FOR SENSORLESS STATE ESTIMATION, DISTURBANCE ESTIMATION, AND MODEL ADAPTION FOR ROTARY STEERABLE DRILLING SYSTEMS

(71) Applicant: Halliburton Energy Services, Inc., Houston, TX (US)

(72) Inventors: Venkata Madhukanth Vadali, Houston, TX (US); Jason D. Dykstra, Spring, TX (US); Xiaoqing Ge, The Woodlands, TX (US); Yuzhen Xue, Humble, TX (US); Xingyong Song, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 545 days.

(21) Appl. No.: 15/563,316

(22) PCT Filed: Apr. 29, 2015

(86) PCT No.: PCT/US2015/028299
§ 371 (c)(1),
(2) Date: Sep. 29, 2017

(87) PCT Pub. No.: WO2016/175797
PCT Pub. Date: Nov. 3, 2016

(65) Prior Publication Data
US 2018/0066475 A1 Mar. 8, 2018

(51) Int. Cl.
*E21B 7/04* (2006.01)
*E21B 44/00* (2006.01)
(Continued)

(52) U.S. Cl.
CPC ............. *E21B 7/043* (2013.01); *E21B 7/04* (2013.01); *E21B 44/00* (2013.01); *E21B 47/02* (2013.01);
(Continued)

(58) Field of Classification Search
CPC . E21B 7/043; E21B 7/04; E21B 44/00; E21B 47/02; E21B 47/022; E21B 47/09;
(Continued)

(56) References Cited

U.S. PATENT DOCUMENTS

| 5,844,132 A | 12/1998 | Fabret |
| 5,852,235 A * | 12/1998 | Pavone .................. E21B 45/00 73/152.45 |

(Continued)

FOREIGN PATENT DOCUMENTS

| CN | 1771665 A | 5/2006 |
| CN | 101333923 A | 12/2008 |

(Continued)

OTHER PUBLICATIONS

X. Zhao and et al, "Dynamic Factor Madel on Directional Drilling System", 2012 Prognostics & System Health Management Conference (PHM-2012 Beijing) (Year: 2012).*

(Continued)

*Primary Examiner* — Douglas Kay
(74) *Attorney, Agent, or Firm* — Chamberlain Hrdlicka

(57) ABSTRACT

A method of estimating a state of a rotary steerable drilling system comprising applying a control input to a rotary steerable drilling system, sensing an actual output of the rotary steerable drilling system, inputting the control input into a mathematical model of the rotary steerable drilling system, receiving an estimated output of the rotary steerable drilling system from the mathematical model, generating an error compensation signal based on a difference between the (Continued)

actual output and the estimated output, and applying the error compensation signal to the mathematical model.

15 Claims, 8 Drawing Sheets

(51) Int. Cl.
| | | |
|---|---|---|
| *E21B 47/09* | (2012.01) | |
| *G06F 9/455* | (2018.01) | |
| *E21B 47/02* | (2006.01) | |
| *G06F 30/20* | (2020.01) | |
| *E21B 47/022* | (2012.01) | |
| *G05B 13/04* | (2006.01) | |
| *G06F 111/10* | (2020.01) | |
| *E21B 34/06* | (2006.01) | |

(52) U.S. Cl.
CPC ............ *E21B 47/022* (2013.01); *E21B 47/09* (2013.01); *G05B 13/041* (2013.01); *G06F 9/455* (2013.01); *G06F 30/20* (2020.01); *E21B 34/06* (2013.01); *G06F 2111/10* (2020.01)

(58) Field of Classification Search
CPC ....... E21B 34/06; G05B 13/041; G06F 9/455; G06F 17/5009; G06F 2217/16
See application file for complete search history.

(56) References Cited

U.S. PATENT DOCUMENTS

| | | | |
|---|---|---|---|
| 7,464,013 B2 | 12/2008 | Huang | |
| 7,506,696 B2 | 3/2009 | Weston | |
| 7,510,027 B2 | 3/2009 | Weston | |
| 7,717,194 B2 | 5/2010 | Weston | |
| 7,975,778 B2 | 7/2011 | Weston | |
| 8,393,413 B2 | 3/2013 | Weston et al. | |
| 8,672,056 B2 | 3/2014 | Clark et al. | |
| 8,676,558 B2 | 3/2014 | Pirovolou | |
| 8,844,132 B2 * | 9/2014 | Blais ........................ | B23C 3/18 |
| | | | 29/557 |
| 9,655,679 B2 * | 5/2017 | Desai ..................... | A61B 90/11 |
| 2001/0034560 A1 * | 10/2001 | Krogmann ........... | G05B 13/027 |
| | | | 700/31 |
| 2002/0148646 A1 * | 10/2002 | Schultz .................. | E21B 12/02 |
| | | | 175/40 |
| 2003/0006671 A1 * | 1/2003 | Hiedenstierna ........ | G01C 19/56 |
| | | | 310/319 |
| 2004/0167762 A1 | 8/2004 | Chen | |
| 2004/0256152 A1 * | 12/2004 | Dashevskiy ............ | E21B 44/00 |
| | | | 175/25 |
| 2005/0228513 A1 * | 10/2005 | Nihei ...................... | F16F 15/02 |
| | | | 700/52 |
| 2006/0006000 A1 | 1/2006 | Weston | |
| 2007/0187147 A1 | 8/2007 | Weston | |
| 2008/0128171 A1 | 6/2008 | Weston | |
| 2009/0000823 A1 * | 1/2009 | Pirovolou ................ | E21B 7/04 |
| | | | 175/61 |
| 2009/0090555 A1 * | 4/2009 | Boone ..................... | E21B 44/02 |
| | | | 175/45 |
| 2009/0105059 A1 | 4/2009 | Dorry | |
| 2009/0132458 A1 * | 5/2009 | Edwards ................ | G06N 5/025 |
| | | | 706/50 |
| 2009/0178851 A1 | 7/2009 | Weston | |
| 2010/0204808 A1 | 8/2010 | Thiele | |
| 2010/0218994 A1 | 9/2010 | Weston | |
| 2013/0048383 A1 * | 2/2013 | Panchal ................... | E21B 7/04 |
| | | | 175/61 |
| 2013/0296885 A1 * | 11/2013 | Desai .................. | A61B 17/3421 |
| | | | 606/130 |
| 2014/0116776 A1 | 5/2014 | Marx et al. | |
| 2014/0163888 A1 * | 6/2014 | Bowler .................. | G01V 11/00 |
| | | | 702/9 |
| 2015/0167392 A1 * | 6/2015 | Sugiura .................... | E21B 7/04 |
| | | | 175/45 |
| 2015/0218887 A1 * | 8/2015 | Bayliss ................. | E21B 44/005 |
| | | | 175/24 |
| 2016/0047219 A1 * | 2/2016 | Jeffryes .................. | E21B 44/00 |
| | | | 700/275 |
| 2016/0168973 A1 * | 6/2016 | Dykstra .................. | E21B 7/068 |
| | | | 175/24 |
| 2017/0146677 A1 * | 5/2017 | Song ........................ | G01V 1/46 |
| 2017/0306739 A1 | 10/2017 | Ge et al. | |
| 2017/0306740 A1 | 10/2017 | Song et al. | |
| 2017/0306742 A1 | 10/2017 | Xue et al. | |
| 2017/0335670 A1 | 11/2017 | Dykstra et al. | |
| 2017/0370151 A1 * | 12/2017 | Banirazi-Motlagh ........................ | |
| | | | G05B 15/02 |

FOREIGN PATENT DOCUMENTS

| | | |
|---|---|---|
| CN | 102301290 A | 12/2011 |
| CN | 104234696 A | 12/2014 |

OTHER PUBLICATIONS

A. Marouf and et al, "Sensorless Control of Electric Power Assisted Steering System", 2012 20th Mediterranean Conference on Control & Automation (MED) Barcelona, Spain, Jul. 3-6, 2012 (Year: 2012).*

International Search Report and Written Opinion dated Feb. 11, 2016 for PCT Application PCT/US2015/028299 filed on Apr. 29, 2015. 19 pages.

* cited by examiner

SYSTEMS AND METHODS FOR SENSORLESS STATE ESTIMATION, DISTURBANCE ESTIMATION, AND MODEL ADAPTION FOR ROTARY STEERABLE DRILLING SYSTEMS

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Directional drilling is commonly used to drill non-vertical wellbores. For example, a directional drilling operation may be conducted when the target pay zone cannot be reached from a land site vertically above it. In order to form such wells, a direction drilling system is used. One example of a direction drilling system is a point-the-bit rotary steerable drilling system, in which the direction of the bit is changed by bending the shaft running through it, thereby changing the drilling direction. The tilt angle of the bit is often referred to as the toolface angle, which is described in further detail below with reference to FIG. 1B.

A rotary steerable system requires various control inputs or settings to control the system behavior and drilling operation. Generally, the more accurately the drilling system is controlled, the better it performs, ultimately leading to a more successful drilling operation.

As the rotary steerable system drills a wellbore, it exhibits a number of outputs and states, such as flow rate, turbine speed, turbine acceleration, rate of change of toolface, disturbances among others. The more data that is collected regarding such outputs and states, the more finely the drilling system can be controlled. Typically, in order to obtain measurements of certain such states, the drilling system needs to be instrumented with a host of sensing devices to take the respective measurements. However, due to cost-benefit constraints, space constraints, performance and reliability constraints, among others, it may not be feasible or practical to implement such sensing devices in the rotary steerable system. Thus, important data which may improve the effectiveness of a drilling operation are not measured or logged. As such, there remains a need for a solution which provides insight into such states of a rotary steerable system without requiring the implementation of sensing devices.

BRIEF DESCRIPTION OF THE DRAWINGS

Illustrative embodiments of the present disclosure are described in detail below with reference to the attached drawing figures, which are incorporated by reference herein and wherein:

FIG. 5B-1 and FIG. 5B-2 couple at points A, B, C, D, E, and F to illustrate a functional block diagram of a simulator controller coupled with the mathematical model of FIG. 3B, in accordance with example embodiments of the present disclosure;

Figure 1A:
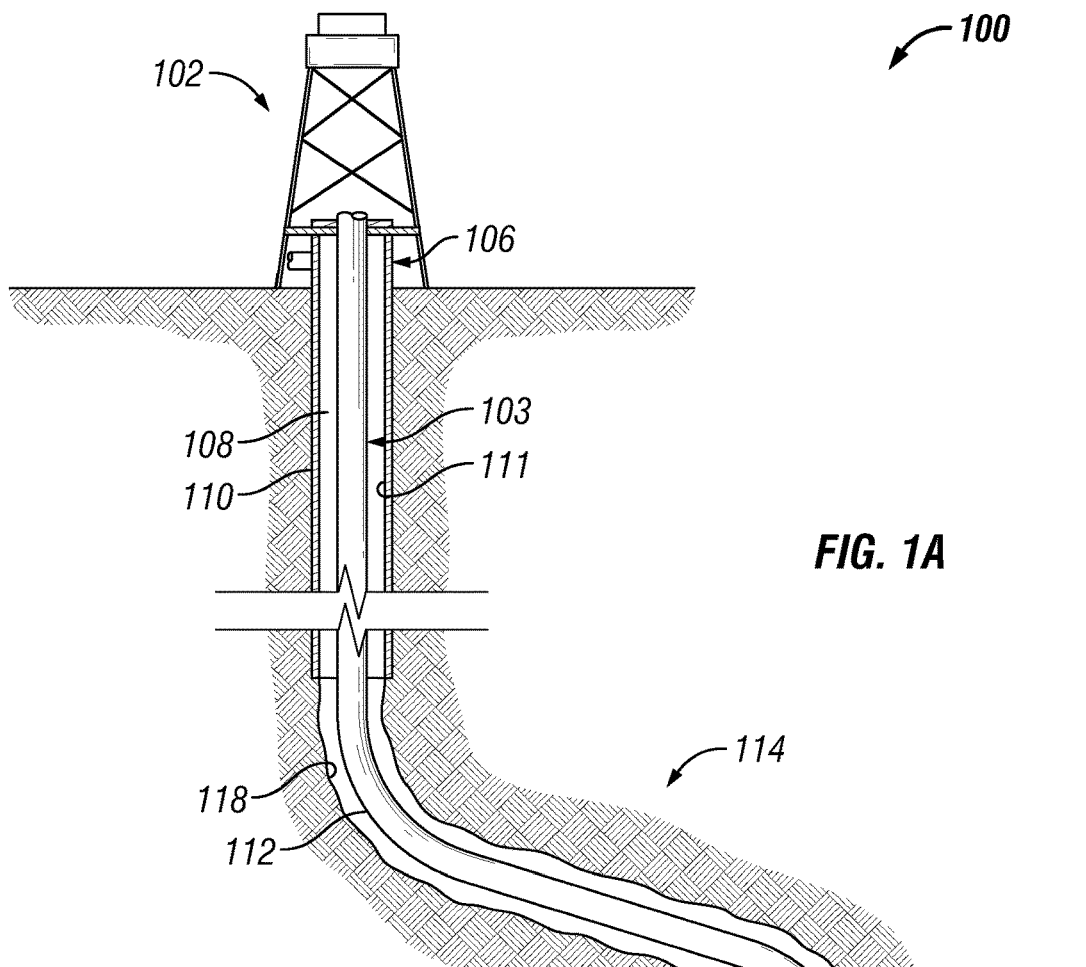
FIG. 1A illustrates a well being drilled by a directional drilling system, in accordance with example embodiments of the present disclosure.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

The following discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

The present disclosure is directed towards a state estimator for a rotary steerable system which can be used to estimate an output and one or more states of a rotary steerable system in response to a received input. In certain embodiments, the received input is a drive voltage value. In certain embodiments, the output is a toolface angle. In certain embodiments, the states may include flow rate, turbine speed, turbine acceleration, rate of change of toolface, disturbances, among others. The state estimator generates such estimates by employing a mathematical model of a rotary steerable system, which captures the function between the input and outputs/states of the rotary steerable system and can thus be used to estimate the behavior or outputs/states of the rotary steerable system given certain inputs. Thus, the state estimator is able to generate an estimate of the states of the rotary steerable system, providing insight into the actual states of the rotary steerable system without having to instrument the rotary steerable system with sensors that would otherwise be required to obtain such data. Having such insights into the states of the rotary steerable system allows the tool to be controlled more precisely, and ultimately perform more effectively.

By obtaining one actual output from the physical a rotary steerable system and comparing the actual output to the corresponding estimated output generated by the state estimator, the state estimator is able to self-calibrate and refine the mathematical model in order to increase the fidelity of the estimated outputs and states generated by the state estimator.

The present disclosure utilizes a rotary steerable drilling system as one example system to which the techniques described herein can be applied, such that detailed aspects of the disclosure can be explained with the context of a specific application. However, the systems and methods described herein are applicable to various other systems, such as conventional drilling systems, as will be appreciated by one skilled in the art.

Referring to the drawings, FIG. 1A illustrates a wellbore 114 being drilled by a drilling system 100, in accordance with example embodiments of the present disclosure. Various types of drilling equipment such as a rotary table, drilling fluid pumps and drilling fluid tanks (not expressly shown) may be located at a well site 106. For example, the well site 106 may include a drilling rig 102 that has various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

The drilling system 100 may also include a drill string 103 associated with a drill bit 101 that may be used to form a wide variety of wellbores or bore holes such as generally diagonal or directional wellbore 114. The term "directional drilling" may be used to describe drilling a wellbore or portions of a wellbore that extend at a desired angle or angles relative to vertical. The desired angles may be greater than normal variations associated with vertical wellbores. Directional drilling may be used to access multiple target reservoirs within a single wellbore 114 or reach a reservoir that may be inaccessible via a vertical wellbore. A rotary steerable drilling system 123 may be used to perform directional drilling. The rotary steerable drilling system 123 may use a point-the-bit method to cause the direction of the drill bit 101 to vary relative to the housing of the rotary steerable drilling system 123 by bending a shaft (e.g., inner shaft 208 shown in FIG. 2) running through the rotary steerable drilling system 123.

The drilling system 100 includes a bottom hole assembly (BHA) 120. The BHA 120 may include a wide variety of components configured to form the wellbore 114. For example, the BHA may include components 122a and 122b. Such components 122a and 122b may include, but are not limited to, drill bits (e.g., the drill bit 101), coring bits, drill collars, rotary steering tools (e.g., the rotary steerable drilling system 123), directional drilling tools, downhole drilling motors, reamers, hole enlargers or stabilizers. The number and types of components 122 included in the BHA 120 may depend on anticipated downhole drilling conditions and the type of wellbore that is to be formed. The BHA 120 may also include various types of well logging tools (not expressly shown) and other downhole tools associated with directional drilling of a wellbore. Examples of logging tools and/or directional drilling tools may include, but are not limited to, acoustic, neutron, gamma ray, density, photoelectric, nuclear magnetic resonance, rotary steering tools and/or any other commercially available well tool. Further, the BHA 120 may also include a rotary drive (not expressly shown) connected to components 122a and 122b and which rotates at least part of the drill string 103 together with components 122a and 122b.

The wellbore 114 may be defined in part by a casing string 110 that may extend from the surface of the well site 106 to a selected downhole location. Portions of the wellbore 114 that do not include the casing string 110 may be described as "open hole." Various types of drilling fluid may be pumped from the surface of the well site 106 downhole through the drill string 103 to the attached the drill bit 101. The drilling fluids may be directed to flow from the drill string 103 to respective nozzles passing through the drill bit 101. The drilling fluid may be circulated uphole to the well surface 106 through an annulus 108. In open hole embodiments, the annulus 108 may be defined in part by an outside diameter 112 of the drill string 103 and an inside diameter 118 of the wellbore 114. In embodiments using a casing string 110, the annulus 108 may be defined by an outside diameter 112 of the drill string 103 and an inside diameter 111 of the casing string 110.

The drill bit 101 may include one or more blades 126 that may be disposed outwardly from exterior portions of a rotary bit body 124 of the drill bit 101. The blades 126 may be any suitable type of projections extending outwardly from the rotary bit body 124. The drill bit 101 may rotate with respect to a bit rotational axis 104 in a direction defined by directional arrow 105. The blades 126 may include one or more cutting elements 128 disposed outwardly from exterior portions of each blade 126. The blades 126 may also include one or more depth of cut controllers (not expressly shown) configured to control the depth of cut of the cutting elements 128. The blades 126 may further include one or more gage pads (not expressly shown) disposed on blades 126. The drill bit 101 may be designed and formed in accordance with teachings of the present disclosure and may have many different designs, configurations, and/or dimensions according to the particular application of the drill bit 101.

Figure 1B:
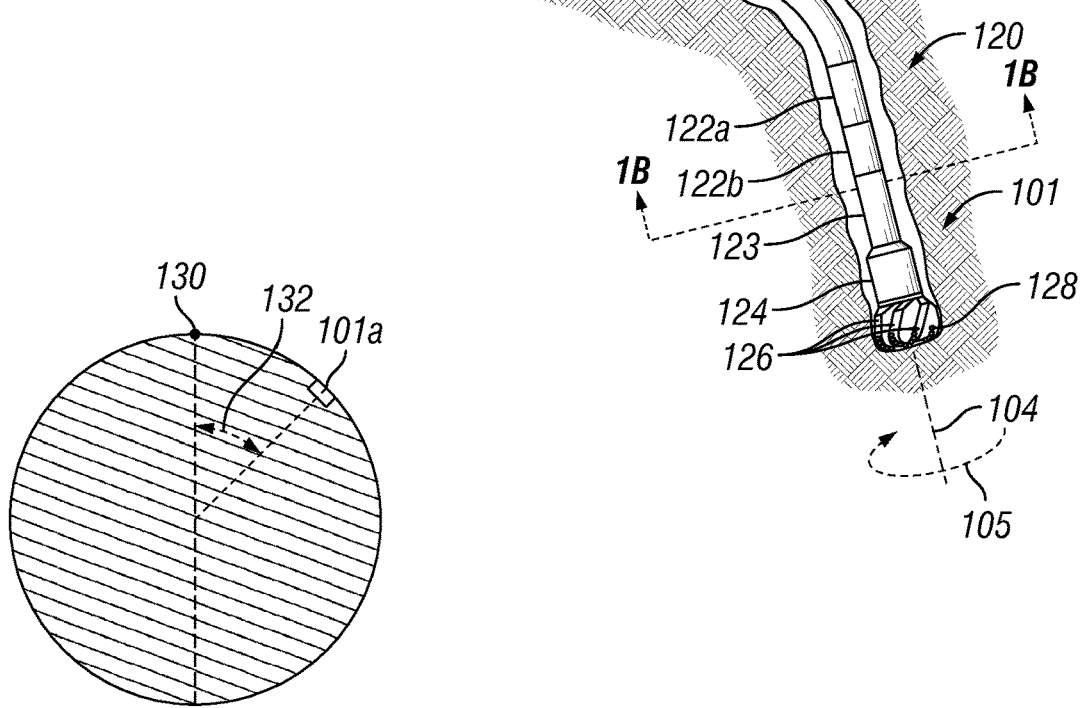
FIG. 1B illustrates an example toolface of the directional drilling system, in accordance with example embodiments of the present disclosure.
Figure 2:
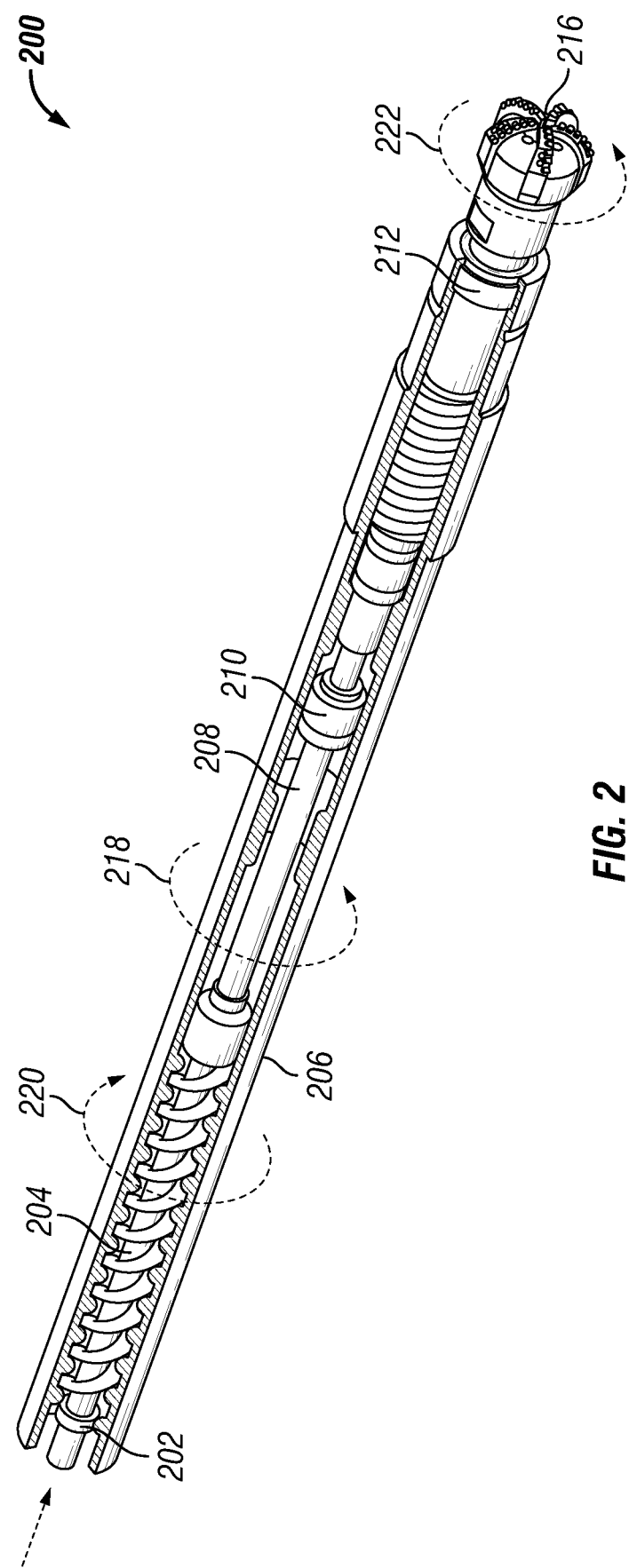
FIG. 2 illustrates a cut away view of a rotary steerable drilling system, in accordance with example embodiments of the present disclosure.

The drill bit 101 may be a component of the rotary steerable drilling system 123, discussed in further detail in FIG. 2. The drill bit 101 may be steered, by adjusting the toolface of the drill bit 101, to control the direction of the drill bit 101 to form a directional wellbore 114. The toolface may be the angle, measured in a plane perpendicular to the drill string axis, which is between a reference direction on the drill string 103 and a fixed reference, and may be any angle between +180° and −180°. For a directional wellbore, the fixed reference may be the top of the wellbore, shown in FIG. 1B as point 130. The toolface may be the angle between the fixed reference and the reference direction, e.g., the tip of the drill bit 101. In FIG. 1B, the toolface angle 132 is the angle between point 130, e.g., the top of the wellbore, and the drill bit tip 101a. In other embodiments, the fixed reference may be magnetic north, a line opposite to the direction of gravity, or any other suitable fixed reference point.

FIG. 2 illustrates a perspective view of a rotary steerable drilling system 200. The rotary steerable drilling system 200 may include a shear valve 202, a turbine 204, a housing 206, an inner shaft 208, an eccentric cam 210, a plurality of thrust bearings 212, and a drill bit 216. The housing 206 may rotate with a drill string, such as the drill string 103 shown in FIG. 1A. For example, the housing 206 may rotate in direction 218. To maintain a desired toolface while the housing 206 rotates, the inner shaft 208 may rotate in the opposite direction of, and at the same speed as, the rotation of the housing 206. For example, the inner shaft 208 may rotate in direction 220 at the same speed as the housing 206 rotates in direction 218.

The shear valve 202 may be located uphole of the other components of the rotary steerable drilling system 200. The shear valve 202 may be designed to govern the flow rate of drilling fluid into the turbine 204. For example, the shear valve 202 may be opened by a fractional amount such that the flow rate of drilling fluid that flows into the turbine 204 increases as the shear valve 202 is opened. The rotary steerable drilling system 200 may contain a motor (not expressly shown) which opens and closes the shear valve 202. A current or voltage sent to the motor may change the amount that shear valve 202 is opened. While the present example rotary steerable drilling system 200 includes a shear valve 202, other embodiments of a rotary steerable drilling system 200 may instead include any type of valve that controls the flow rate of fluid into the turbine 204.

The drilling fluid flowing into the turbine 204 may create a torque to rotate the inner shaft 208. Changing the flow rate of the drilling fluid into the turbine 204 may change the amount of torque created by the turbine 204 and thus control the speed of rotation of the inner shaft 208.

A set of planetary gears may couple the housing 206, the inner shaft 208, and the thrust bearings 212. The inner shaft 208 may rotate at the same speed but in the opposite direction of the housing 206 to maintain the toolface at the desired angle. The positioning of the planetary gears may contribute to maintaining a toolface between +180 and −180 degrees.

The eccentric cam 210 may be designed to bend rotary steerable drilling system 200 to point the drill bit 216. The eccentric cam 210 may be any suitable mechanism that may point the drill bit 216, such as a cam, a sheave, or a disc. The thrust bearings 212 may be designed to absorb the force and torque generated by the drill bit 216 while the drill bit 216 is drilling a wellbore (e.g., the wellbore 114 shown in FIG. 1A). The planetary gears may be connected to the housing 206 and the inner shaft 208 to maintain the drill bit 216 at a desired toolface. To point and maintain the drill bit 216 at a specified toolface, the toolface may be held in a geostationary position (e.g., the bit orientation in the plane perpendicular to the drillstring remains constant with respect to the formation) based on the rotation of the inner shaft 208 in an equal and opposite direction to the rotation of the housing 206 with the drill string. While the toolface may be geostationary, the drill bit 216 may rotate to drill a wellbore. For example, the drill bit 216 may rotate in direction 222.

During drilling operations, the housing 206 may not rotate at a constant speed due to disturbances acting on the housing 206 or on a drill bit 216. For example, during a stick-slip situation, the drill bit 216 and housing 206 may rotate in a halting fashion where the drill bit 216 and housing 206 stop rotating at certain times or rotate at varying speeds. As such, the rotation speed of the inner shaft 208 may need to be adjusted during the drilling operation to counteract the effect of the disturbances acting on housing 206 and maintain the inner shaft 208 rotating equal and opposite of the rotation of the housing 206.

Figure 3A:
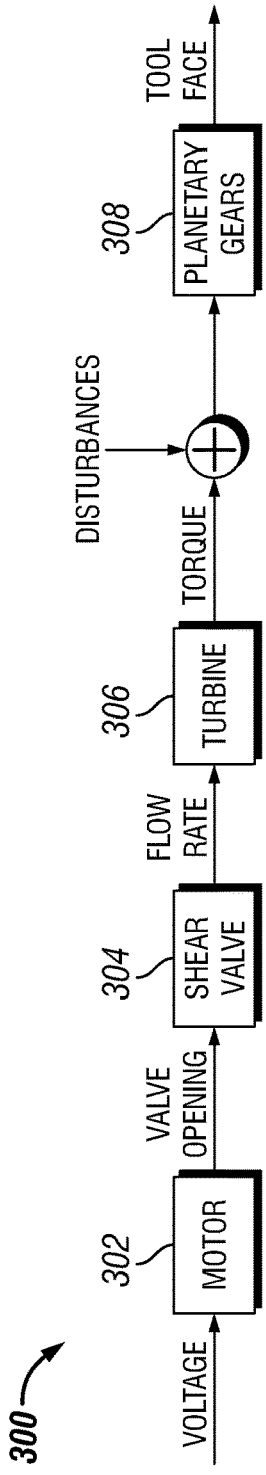
FIG. 3A illustrates a simplified block diagram of the rotary steerable drilling system, in accordance with example embodiments of the present disclosure.

The rotary steerable drilling system 200 can be represented by a mathematical model. The model may generally predict the behavior and operation states of the rotary steerable drilling system 200 in response to disturbances and/or inputs to the rotary steerable drilling system 200. FIG. 3A illustrates a high-level block diagram 300 or simplified model of the rotary steerable drilling system 200, in accordance with example embodiments of the present disclosure. A voltage may be transmitted to a motor 302 such that the motor 302 may open a shear valve 304 in response to the voltage. The opening of the shear valve 304 may cause drilling fluid to flow through a turbine 306 at a flow rate determined by the amount the shear valve 304 is opened. The drilling fluid flowing through the turbine 306 may cause a torque to be produced such that the torque rotates an inner shaft. Additionally, any disturbances acting on the rotary steerable drilling system 200 may be modeled and summed with the torque created by the flow of drilling fluid through the turbine 306 to determine the total torque causing a rotation of the inner shaft. The inner shaft rotation may cause a planetary gear system 308 to rotate such that the position of planetary gear system 308 controls the toolface. Thus, in such an embodiment, the toolface is a function of the voltage and disturbances applied to the system 300.

Figure 3B:
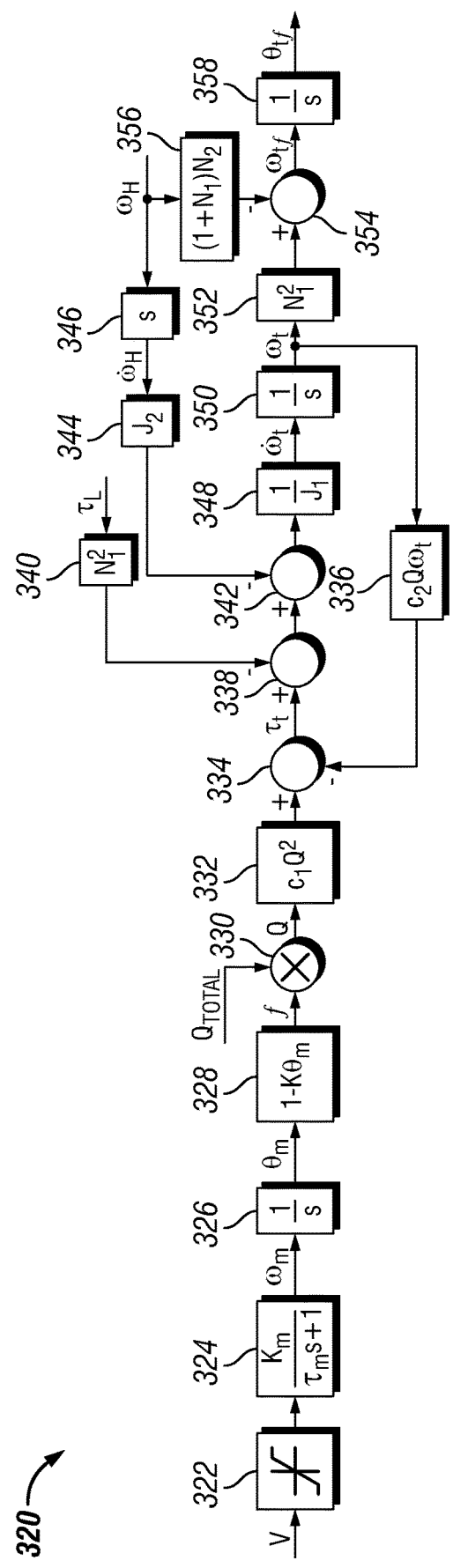
FIG. 3B illustrates a detailed functional block diagram of the rotary steerable drilling system, representing the rotary steerable drilling system as a mathematical model, in accordance with example embodiments of the present disclosure.

FIG. 3B illustrates a functional block diagram or mathematical model 320 of the rotary steerable drilling system 200, in accordance with example embodiments of the present disclosure. The model 320 shows the inputs and outputs of each component of an exemplary rotary steerable drilling system 200. The model 320 may model the dominant properties of the rotary steerable drilling system such shear valve opening properties, flow rate and turbine rotation properties, the coupling between the turbine angular velocity and the housing angular velocity, and the effect of the coupling on the toolface. In some embodiments, the model 320 may not include properties that have minimal impact on the rotary steerable drilling system, such as the frictional effects in the planetary gear system and the effect of temperature changes on the rotary steerable drilling system. In some other embodiments, the model 320 may include more properties than those presently shown.

The mathematical model 320 may include a saturation model 322 that may be used to limit the input into the rotary steerable drilling system 200. In the present embodiment, the input is a voltage, V. In other embodiments, such as embodiments where an alternating current (AC) motor is used, the input may be a current, a frequency of the current, or a frequency of the voltage. The saturation model 322 may provide a limit on the voltage that is received by the motor 302 of the rotary steerable drilling system 200. The model 320 further includes an example Laplace transform model 324 of the motor 302, where $K_m$ represents a model constant, $\tau_m$ represents the time constant of the motor, and s represents a Laplace parameter. The Laplace transform model 324 models the motor response to an input voltage, such as the voltage received from the saturation model 322, and the output of the saturation model 324 may be an angular velocity of the motor, $\omega_m$.

The model further includes another Laplace transform 326 used to calculate the angular displacement of the motor, $\theta_m$, based on the angular velocity of the motor 302. The calculated angular displacement of the motor may be an input into a shear valve model 328. The shear valve model 328 may be used to determine the fractional valve opening, f, of the shear valve 304 based on the angular displacement of the motor 302. The fractional shear valve opening may be a value between zero and one, where zero indicates that the shear valve 304 is fully closed and one indicates that the shear valve 304 is fully open.

The fractional shear valve opening may be used to calculate the flow rate of drilling fluid through the turbine 306 of the rotary steerable drilling system 200. At a multiplication operator 330, the total flow rate of drilling fluid into the system, $Q_{total}$, may be multiplied by the fractional shear valve opening to determine the flow rate through the turbine 306 of the rotary steerable drilling system, Q. Drilling fluid that does not flow through the turbine 306 may be directed downhole to the drill bit, such as drill bit 101 shown in FIG. 1A.

The model 320 also includes a torque function 332 of the turbine 306 which may use the flow rate of drilling fluid through the turbine 306 to calculate the torque produced by the turbine 306 due to the fluid flow rate. In the calculation performed in the torque function 332, Q is the flow rate through the turbine 306 and $c_1$ is a turbine parameter. The torque produced by the turbine 306 due to the current angular velocity of the turbine 306, calculated a second torque function 336, may be subtracted from the torque produced by the turbine 306 due to the fluid flow rate, at a summing operator 334. In the calculation performed in function 336, $\omega_t$ is the angular velocity of the turbine 306 and $c_2$ is a turbine parameter. The result of the summing operator 334 may be the torque produced by the turbine, $\tau_t$.

Prior to translating the torque of the turbine 306 into a toolface, the characteristics of the mechanical properties of the rotary steerable drilling system 200 may be modeled. The load torques on the system, $\tau_L$, and the gear ratio of the planetary gear system, $N_1$, may be modeled in a function 340 and subtracted from the torque produced by the turbine 306 at a summing operator 338. At function 344, the angular acceleration of the housing of the rotary steerable drilling system, $\omega_H$, is combined with the equivalent inertia of the housing as seen from the turbine, $J_2$, and subtracted from the results of summing operator 338 at summing operator 342. At function 348, the calculated torque from the previous steps may be incorporated into a model of the equivalent inertia of the turbine, inner shaft, and planetary gears, which may calculate the angular acceleration of the turbine, $\omega_t$, which may be integrated by another Laplace transform function 350 to compute the angular velocity of the turbine, $\omega_t$.

At function 352, the angular velocity of the turbine 306 may be input into a model of the planetary gear ratio where $N_1$ represents the gear ratio of the planetary gear system. The result of the function 352 may be combined at summing operator 354 with a function 356 of the effect of the angular velocity of the housing and the planetary gear ratios to determine the angular velocity of the toolface, $\omega_{tf}$. The angular velocity of the toolface is the rate of change of the angle of the toolface over time. The angular velocity of the toolface may be integrated by a Laplace transform function 358 to determine the resulting toolface, $\theta_{tf}$. Thus, the toolface angle is a primary output of the rotary steerable drilling system 200, which can be estimated by the mathematical model 320. In some example embodiments, the rotary steerable drilling system 200 may be modelled by a more sophisticated mathematical model, which takes into account more detailed functions and attributes of the rotary steerable drilling system 200. In some example embodiments, the mathematical model may be simplified, removing one or more model components which are relatively less contributive to the accuracy of the output. In some example embodiments, the rotary steerable drilling system may be modelled using a different mathematical model than the one presently illustrated.

Modifications, additions, or omissions may be made to FIG. 3B without departing from the scope of the present disclosure. For example, the equations shown in the blocks of FIG. 3B are for illustration only and may be modified based on the characteristics of the rotary steerable drilling system. Any suitable configurations of components may be used. For example, while the functional block diagram 320 illustrates a rotary steerable drilling system including a shear valve and fluid flow to generate torque from a single stage turbine, alternatively an electric motor may be used to generate torque from the turbine. Other rotary steerable drilling system embodiments may include magnetic or electro-magnetic actuators, pneumatic actuators with single or multi-stage turbines, or hydraulic actuators with multi-stage turbines.

The physical rotary steerable drilling system 200 exhibits a plurality of states, such as flow rate, turbine speed, turbine acceleration, rate of change of toolface, disturbances, among others. Knowing such internal states of the rotary steerable drilling system 200 allows for more precise control of the rotary steerable drilling system 200 and ultimately leads to more effective drilling. As discussed in the background section of the present disclosure, in order to measure such states of the rotary steerable drilling system 200, the system 200 must be instrumented with a suite of additional sensing devices. However, it may not be economical or practically feasible to do so. The present disclosure, specifically as described with reference to FIGS. 4-7, provides systems and methods for estimating such states of the rotary steerable drilling system 200 by utilizing the mathematical model 320 of the rotary steerable drilling system 200.

Figure 4:
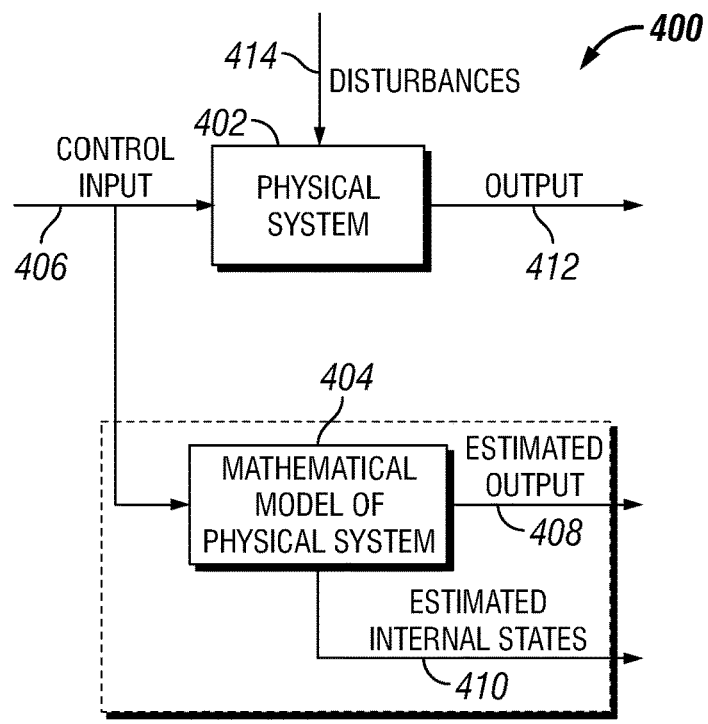
FIG. 4 illustrates a block diagram of an open loop state estimator, in accordance with example embodiments of the present disclosure.

FIG. 4 illustrates a block diagram of an open loop state estimator 400, in accordance with example embodiments of the present disclosure. The open loop state estimator includes a system simulator 404 configured to simulate the operational behavior of a physical system 402, such as the rotary steerable drilling system 200 of FIG. 2, in response a control input 406. In an example embodiment, the system simulator 404 includes a mathematical model of the physical system 402, such as the mathematical model 320 of FIG. 3. The mathematical model 404 includes an algorithm which calculates one or more outputs 408 or states 410 of the physical system 402. In an example embodiment, the system simulator 404 is implemented as computer-readable code in a processing unit, the processing unit having an input element for receiving and applying an input value to the simulator 404 and an output module for outputting one or more outputs values from the simulator 404. In an example application, during operation of the physical system 402, a control input 406 is applied to the physical system 402. In some embodiments, the control input 406 includes a voltage value. The same control input 406 is applied to the simulator 404 and mathematical model. In some embodiments, the simulator 404 converts the control input 406 into a machine readable input value or form suitable appropriate for use with the mathematical model. The system simulator 404 then runs the input 406 through the mathematical model and generates the estimated output 408 and estimated states 410 of the physical system 402. Thus, the states 410 of the physical system 402 can be estimated and obtained without having to instrument the physical system 402 with an additional suite of sensing devices. Meanwhile, the physical system 402 also produces an actual output 412, which can be measured. In some embodiments, the estimated output 408 and the actual output 412 are indications of toolface angle, $\theta_{tf}$.

In theory, if the mathematical model were a perfect representation of the physical system 402 and its operational environment, the estimated output 408 would exactly match the actual output 412 of the physical system 412. Likewise, it could then be assumed that the estimated states 410 are a perfect representation of the actual states of the physical system 402. However, in practice, there may be various sources of error that cause varying degrees of discrepancy between the estimated values and the actual values exhibited by the physical system 402. Thus, there may be a difference between the estimated output 408 and the actual output 412. As such, it may be assumed that the estimated states 410 have a corresponding margin of error. For example, the physical system 402 may be subject to a variety of disturbances 414 which may affect the behavior of the physical system 402 in a manner unaccounted for by the mathematical model 404. The disturbances 414 may include stick slip, system noise, environmental noise, among others. Additionally, other sources of error between the actual output and the estimate output may be include errors inherent in the mathematical model 404, such as parameter errors or characteristics of the physical system 402 that were not modeled or modelled incorrectly in the mathematical model.

Figure 5A:
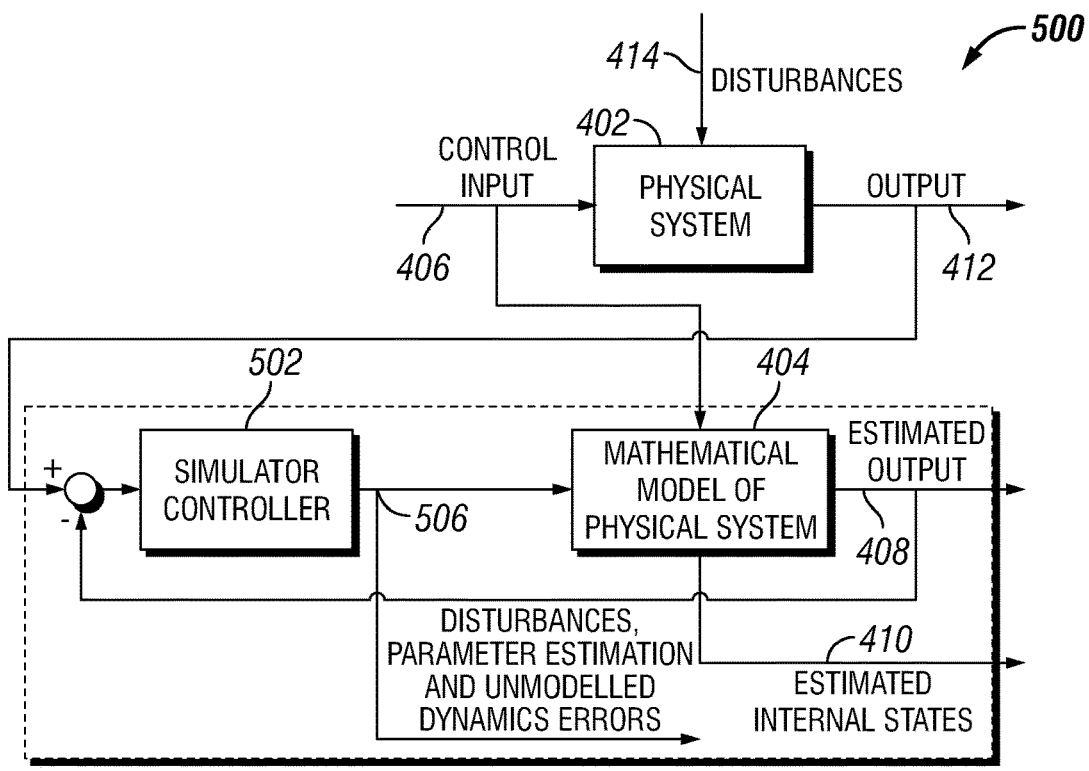
FIG. 5A illustrates a block diagram of a closed loop state estimator, in accordance with example embodiments of the present disclosure.

FIG. 5A illustrates a block diagram of a closed loop estimator 500, in accordance with example embodiments of the present disclosure. The closed loop estimator 500 includes a system simulator 404 which includes the mathematical model of the physical system 402. The closed loop estimator 500 also includes a simulator controller 502. The system simulator 404 receives the actual control input 406 fed into the physical system 402, and generates an estimated output 408 and a set of estimated internal states 410 of the physical system 402. The closed loop estimator 500 includes a feedback mechanism which compares the estimated output 408 generated by the simulator 404 to the actual output 412 generated by the physical system 402. In an example embodiment, the simulator controller 502 receives as inputs, the estimated output 408 and the actual output 412, and uses the error between the estimated output 408 and the actual output 412 to generate an error compensation signal 506. In an example embodiments, the error compensation signal 506 when inputted into the simulator 404 along with the control input 406, allows the simulator 404 to generate an estimated output 408 which closer matches the actual output 412 of the physical system. Thus, the estimated states 410 generated by the simulator 404 also have a higher degree of fidelity. The error compensation signal 506 is configured to drive the difference between the estimated output 408 and the actual output 412 towards zero. Specifically, deviations between the estimated output 408 and the actual output 412 due to disturbances 414 in the physical system 402, errors in the mathematical model, or characteristics of the physical system 402 that were not modeled or modeled incorrectly are compensated for via the simulator controller 502. Thus, the estimated output and estimated states 410 generated by the closed loop estimator 500 are closer to the actual output and states exhibited by the physical system. In some embodiments, the simulator controller gains are tuned such that the estimated output 408 converges with the actual output 412.

The simulator controller 502 can be designed in a variety of different ways depending on the system and desired results. For example, the simulator controller 502 can be as simple as a proportional-integral-differential (PID) controller or a more complex non-linear controller. The complexity of the simulator controller 502 design can depend on the desired compensation accuracy, computational resources, and other design and resource limitations. In some embodiments, the elements of the simulator controller 502 may include a feedforward controller, and one or more physical state feedback decoupling mechanisms configured to decouple one or more system non-linearities and other known disturbances such as coulomb friction. In some embodiments, the simulator controller 502 can be designed based on a Kalman filter, unscented Kalman filter, ensemble Kalman filter, extended Kalman filter, particle filter, among others.

Figures 1, 5B:
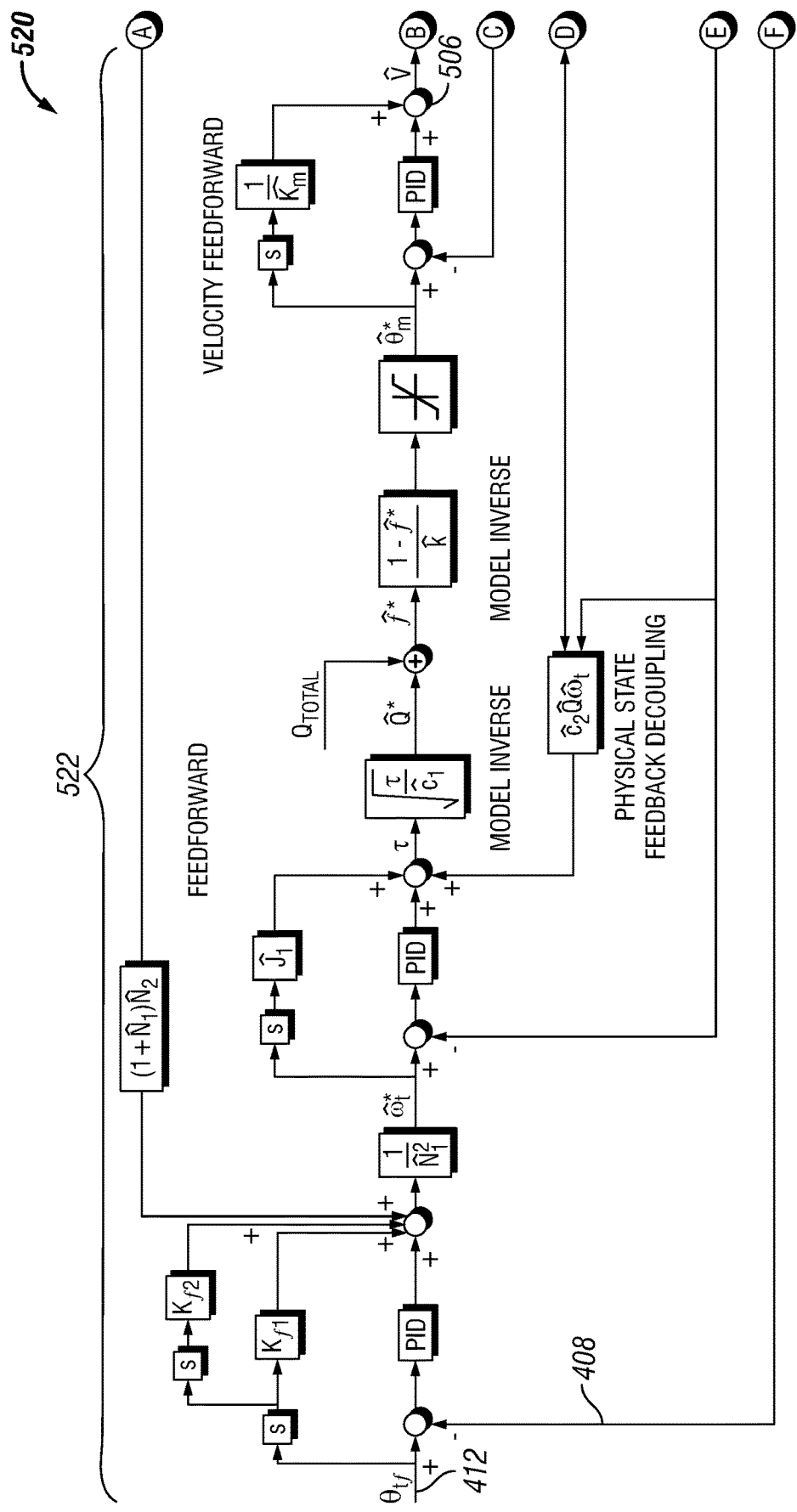
Figures 2, 5B:
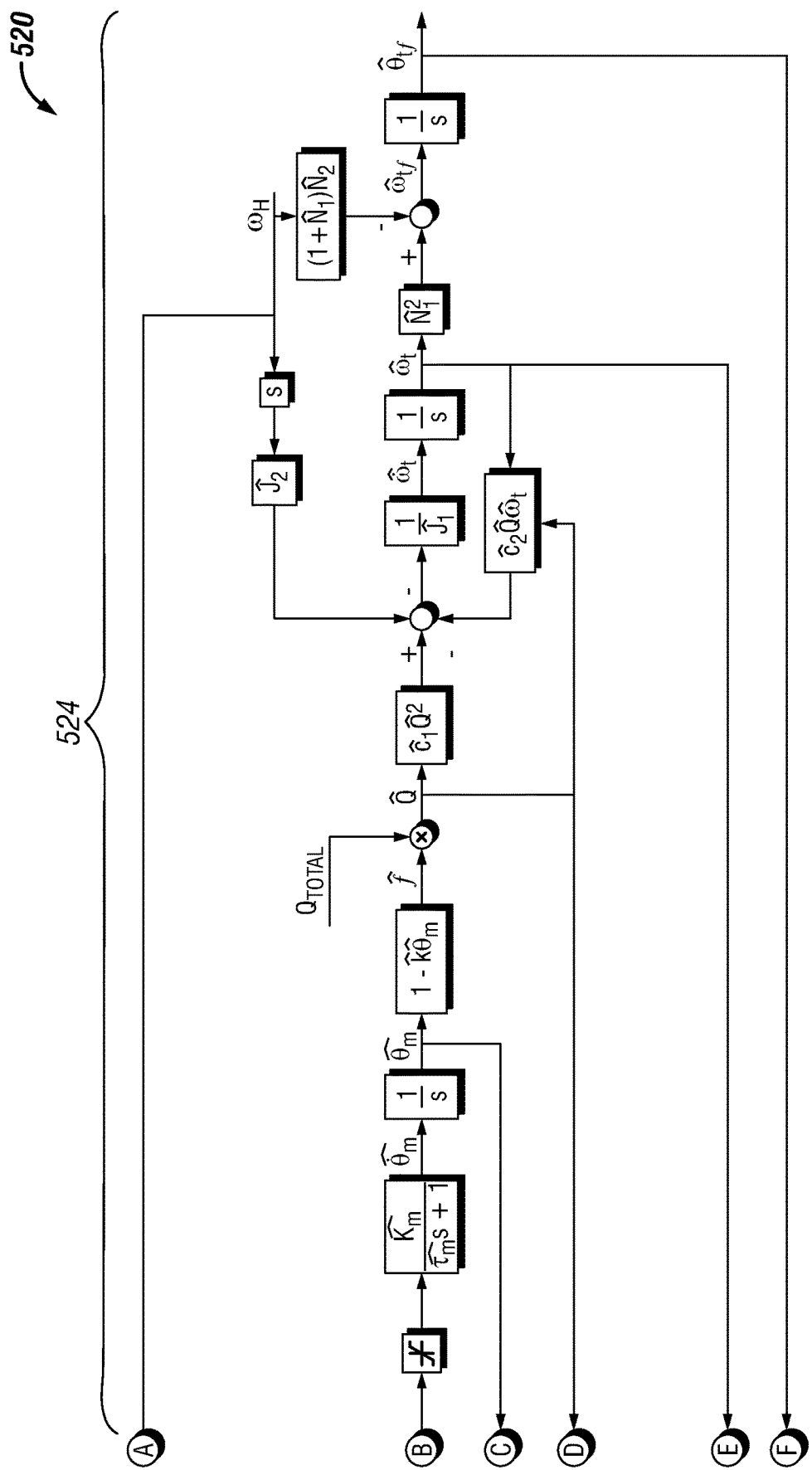

FIG. 5B-1 and FIG. 5B-2 couple at points A, B, C, D, E, and F to illustrate a functional block diagram 520 of an example implementation of a simulator controller 522 in relation to a mathematical model 524 of a physical system, in accordance with example embodiments of the present disclosure. The simulator controller 522 receives the actual output 412 of a physical system and the estimated output from the mathematical model 524 and generates the error compensation signal 506, which is fed into the mathematical model 524. The mathematical model 524 utilizes the error compensation signal 506 in generating the estimated output 408. Thus such feedback, the error between the actual output 412 and the estimated output 408 is driven to zero.

Figure 6:
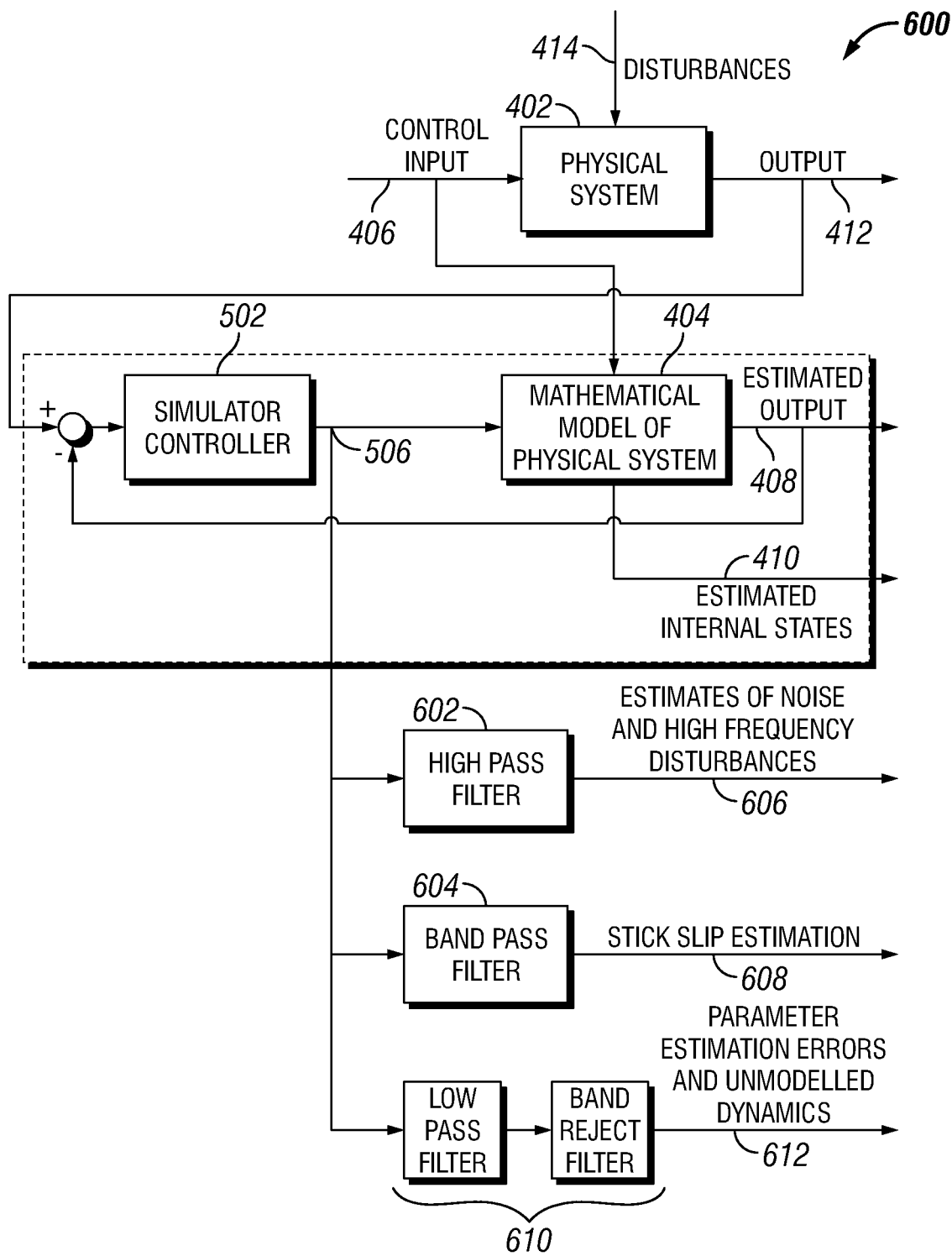
FIG. 6 illustrates a block diagram of a closed loop state estimator with error source estimation, in accordance with example embodiments of the present disclosure.

In some embodiments, the compensation signal 506 also provides insights into the sources of error that caused the discrepancy between the estimated output 408 and the actual output 412. FIG. 6 illustrates a block diagram of a closed loop state estimator 600 with error source estimation, in accordance with example embodiments of the present disclosure. In an example embodiment, similar to the simulator 500 of FIG. 5A, the closed loop state estimator 600 with error source estimation includes the simulator 404, which includes a mathematical model of the physical system 402. The simulator 404 generates an estimated output 408 and a set of estimated states 410 of the physical system 402. The simulator 404 also includes the simulator controller 502 which receives as inputs, the estimated output 408 and the actual output 412, and uses the error between the estimated output 408 and the actual output 412 to generate a compensation signal 506, which is used by the simulator 404 to generate estimated output 408 and internal states 410 with higher fidelity.

Additionally, the state estimator 600 of FIG. 6 further includes one or more signal processing elements such as filters 602, 604, 610. The one or more signal processing elements are configured to identify, from the error compensation signal 506, indications of various sources of error. The sources of error may include various disturbances on the physical system, errors in the mathematical model, or other sources that caused the estimated output to deviate from the actual output. In some embodiments, the one or more filters 602, 604, 610 are applied to the error compensation signal 506. In certain such embodiments, the one or more filters 602, 604, 610 are configured to pass specific signal types that are indicative of respective sources of error. In some embodiments, a high pass filter 602 is implemented, through which various noise and high frequency disturbances 606 can be identified. In some embodiments, a band pass filter 604 is implemented, through which various physical disturbances such as stick slip can be identified. In some embodiments, a low pass filter and band reject filter 610 are implemented, through which mathematical modeling errors 612 can be identified. Examples of possible mathematical modeling errors 612 include model parameter estimation errors or unmodeled system dynamics. Accordingly, the closed loop state estimator 600 with error source estimation is able to provide insight into the source of the error between the estimated output 408 and actual output 412. These errors can be subsequently decoupled from the estimated output 408 and states 410. In doing so, the fidelity of such estimates is increased. In some example embodiments, one or more of the above mentioned filters 602, 604, 610 may be omitted or replaced with alternative filtering or signal processing elements designed to best fit the specific application and desired results. In some example embodiments, the one or more filters 602, 604, 610 may include more or less sophisticated filtering or processing elements than those described and can be configured to identify sources of error to higher or lower levels of granularity.

Figure 7:
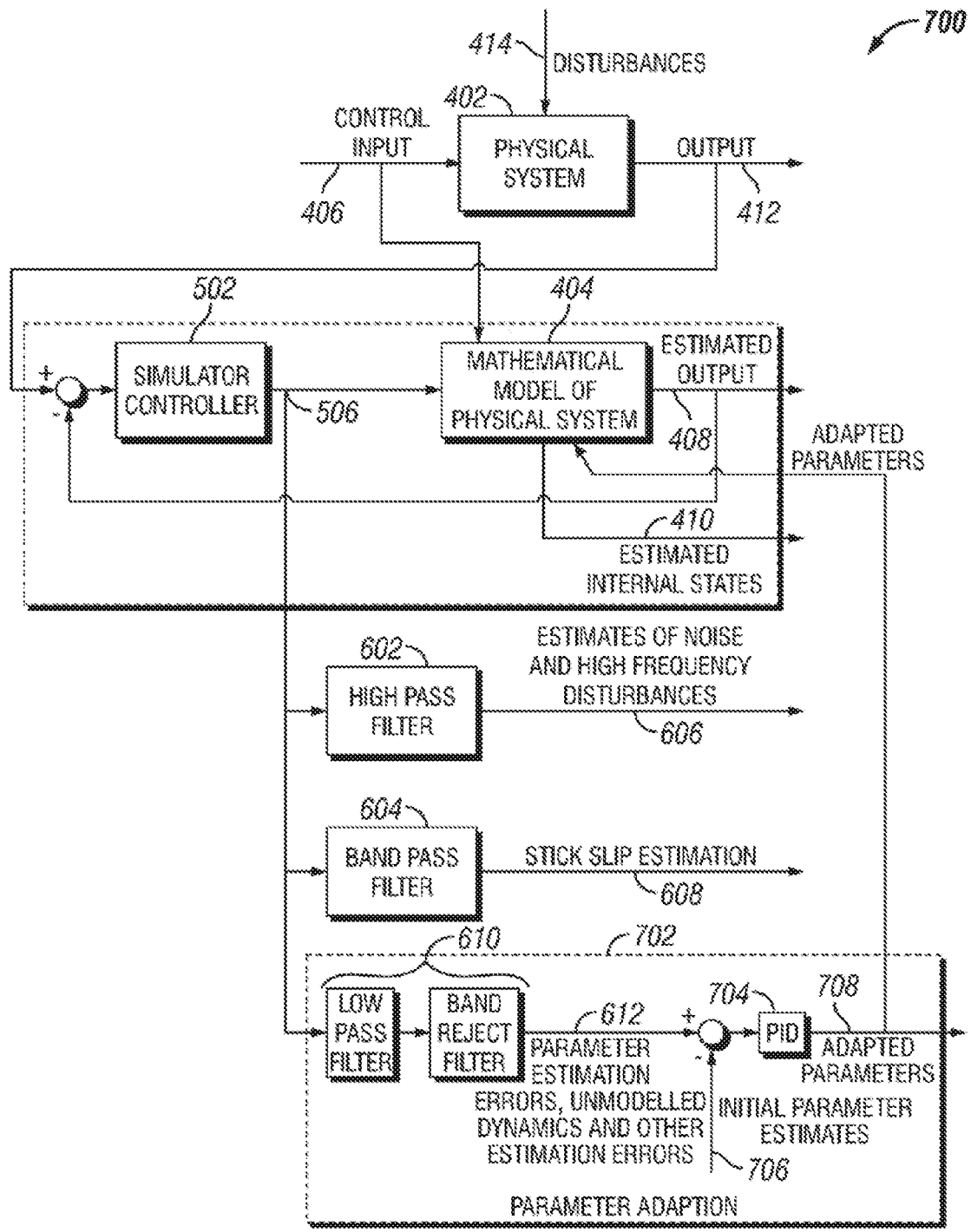
FIG. 7 illustrates a block diagram of a closed loop state estimator with parameter adaption, in accordance with example embodiments of the present disclosure.

FIG. 7 illustrates a block diagram of a closed loop state estimator 700 with model adaption, in accordance with example embodiments of the present disclosure. The closed loop state estimator 700 with model adaption is largely similar to the simulator 600 of FIG. 6. As such, discussion of shared aspects will not be repeated for sake of brevity. In addition to the elements and functionality of the state estimator 600 of FIG. 6, the closed loop state estimator 700 with model adaption enables real-time adjustment of the simulator 404, and specifically the mathematical model. Specifically, the closed loop state estimator 700 with model adaption includes a model adaption module 702. In some embodiments, the model adaption module 702 includes the low pass filter and band reject filter 610 as well as a controller 704. An example of a controller 704 may be PID as shown in FIG. 7. In an example embodiment, the modeling errors 612 identified through the low pass filter and band reject filter 610 are compared to a set of initial model parameters 706 of the simulator 404 or mathematical model, which is fed into a controller such as the PID controller 704. The controller 704 generates a model adaption signal. The model adaption signal 708 includes instructions for modifying the simulator 404 or mathematical model such that the simulator 404 or mathematical model more closely mimics the behavior of the physical system 402, thus generating estimated outputs and states which are closer to the actual output and states exhibited by the physical system. The model adaption signal 708 is configured to drive the model error signal 612 towards a null value. In some embodiments, the simulator 404 or mathematical model can be fine-tuned prior to deployment of the physical system during system tests and calibration processes. In some embodiments, the simulator 404 or mathematical model can be fine-tuned in real-time during actual down-hole operation of the physical system 402. Fine-tuning of the simulator 404 or mathematical model increases the fidelity of the estimated output 408 and states 410.

In some example embodiments, the state estimator of the present disclosure, such as example embodiments illustrated in FIGS. 4, 5A, 6, and 7, can be embedded within the BHA 120 of a drilling system 114 (FIG. 1). Specifically, the simulator 404, simulator controller, and error source processing components 602, 604, 610, 702 can be provided by a processing unit. The processor is one having the necessary hardware components required to carry out the functions of the state estimator as described herein. In some embodiments, the processing unit can be built into the BHA 120 of the drilling system 114. In some embodiments, the processing unit can be a part of control center at the well site 106 or in a locate remote from the well site 106.

In addition to the embodiments described above, many examples of specific combinations are within the scope of the disclosure, some of which are detailed below:

Example 1. A method of estimating a state of a rotary steerable drilling system, comprising
   applying a control input to a rotary steerable drilling system;
   sensing an actual output of the rotary steerable drilling system;
   inputting the control input into a mathematical model of the rotary steerable drilling system;
   receiving an estimated output of the rotary steerable drilling system from the mathematical model;
   generating an error compensation signal based on a difference between the actual output and the estimated output; and
   applying the error compensation signal to the mathematical model.

Example 2. The method of Example 1, further comprising:
   applying the control input and the error compensation signal to the mathematical model;
   receiving a second estimated output from the mathematical model; and
   wherein the difference between the second estimated output and the actual output is smaller than the difference between the estimated output and the actual output.

Example 3. The method of Example 1, further comprising applying an electronic filter to the error compensation signal, wherein the electronic filter passes a signal indicative of an error source.

Example 4. The method of Example 3, wherein the error source is at least one of noise, disturbance, stick-slip, parameter estimation error, and modeling errors.

Example 5. The method of Example 3, further comprising:
   obtaining, from the electronic filter, and indication of estimated modeling error;
   comparing the estimated modeling error with a set of initial model parameters;
   generating a model adaption signal which drives the estimated modeling error to zero; and
   adapting the mathematical model according to the model adaption signal.

Example 6. The method of Example 3, wherein the signal indicative of an error source is indicative of one or more disturbances on the rotary steerable drilling system or noise.

Example 7. The method of Example 1, wherein the control input comprises a voltage or current value.

Example 8. The method of Example 1, wherein the estimated output is a toolface angle.

Example 9. A system for estimating a state of a rotary steerable drilling system, comprising:
   a system simulator comprising a mathematical model of the rotary steerable drilling system, the mathematical model configured to generate an estimated output and an estimated state of the rotary steerable drilling system in response to an input;
   a simulator controller configured to receive an actual output of the rotary steerable drilling system and the estimated output from the system simulator, and generate an error compensation signal based on a difference between the actual output and the estimated output; and wherein the system simulator is configured to receive the error estimation signal.

Example 10. The system of Example 9, wherein the system simulator is configured to generate the estimated output and the estimated state based on the input and the error estimation signal.

Example 11. The system of Example 9, wherein the error compensation signal is configured to drive the difference between the actual output and the estimated output towards zero.

Example 12. The system of Example 9, further comprising an error source detection module configured to receive the error estimation signal and detect one or more sources of error.

Example 13. The system of Example 12, wherein the error source detection module includes at least one of a high pass filter, a band pass filter, a low pass filter, and a band reject filter.

Example 14. The system of Example 12, wherein the one of more sources of error include at least one of disturbances, noise, model parameter estimation errors, and unmodeled system dynamics.

Example 15. The system of Example 12, wherein the error source detection module detects one or more modeling errors and generates a corresponding model adaption signal, wherein the model adaption signal is configured to provide instructions for adjusting the mathematical model and drive the one or more modeling errors towards zero.

Example 16. A rotary steerable drilling system with state estimation, comprising:
 a rotary steerable drilling tool configured to receive a control input and exhibit a sensed output and a state;
 a processing unit providing:
  a rotary steerable drilling tool simulator, wherein the rotary steerable drilling tool simulator comprises a mathematical model of the rotary steerable drilling tool, the rotary steerable drilling tool simulator configured to receive the control input and generate an estimated output and an estimated state of the rotary steerable drilling tool in response to the control input; and
  a simulator controller configured to receive the sensed output of the drilling tool and the estimated output from the drilling tool simulator, and generate an error compensation signal based on a difference between the sensed output and the estimated output;
 wherein the rotary steerable drilling tool simulator is configured to receive the error estimation signal and generate the estimated output and the estimated state in response to the control input and the error estimation signal; and
 wherein the error estimation signal is configured to drive the difference between the actual output and the estimated output towards zero.

Example 17. The rotary steerable drilling system of Example 16, wherein the processing unit further comprises an error source detection module configured to receive the error estimation signal and detect a signal indicative of one or more sources of error.

Example 18. The rotary steerable drilling system of Example 17, wherein the error source detection module is configured to detect a signal indicative of one or more modeling errors and generates a model adaption signal, wherein the model adaption signal is configured to provide instructions for adjusting the mathematical model and thereby drive the signal indicative of one or more modeling errors towards a null value.

Example 19. The rotary steerable drilling system of Example 17, wherein the error source detection module includes at least one of a high pass filer, a band pass filter, a low pass filter, and a band reject filter, configured to pass a signal indicative of at least one of disturbances, noise, model parameter estimation errors, and unmodeled system dynamics.

Example 20. The rotary steerable drilling system of Example 16, wherein the processing unit is coupled to the rotary steerable drilling tool.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

We claim:

1. A method of steering a rotary steerable drilling system, comprising:
 applying, using a processing unit, a control input to a rotary steerable drilling system exhibiting a state;
 sensing an actual output of the rotary steerable drilling system;
 inputting, using the processing unit, the control input into a mathematical model of the rotary steerable drilling system;
 receiving, using the processing unit, an estimated output and an estimated state of the rotary steerable drilling system from the mathematical model in response to the control input without a sensing device in the rotary steerable drilling system to directly measure the state;
 generating, using the processing unit, an error compensation signal based on a difference between the actual output and the estimated output;
 applying, using the processing unit, the error compensation signal as an input to the mathematical model;
 applying a filter, comprising a low pass filter, a band pass filter, a band pass filter, and a high pass filter, to the error compensation signal,
  wherein the filter passes a signal indicative of an error source,
  wherein the low pass filter is used to identify mathematical modeling errors, the band pass filter is used to identify physical disturbances including stick slip and the high pass filter is used to identify high frequency noise and disturbances; and
 steering the rotary steerable drilling system by adjusting a toolface angle based on the estimated state.

2. The method of claim 1, further comprising:
 applying the control input and the error compensation signal as inputs to the mathematical model;
 receiving a second estimated output from the mathematical model; and
 wherein the difference between the second estimated output and the actual output is smaller than the difference between the estimated output and the actual output.

3. The method of claim 1, wherein the error source is at least one of a disturbance or a modeling error.

4. The method of claim 1, further comprising:
obtaining, from the electronic filter, an indication of an estimated modeling error;
comparing the estimated modeling error with a set of initial model parameters;
generating a model adaption signal which drives the estimated modeling error to zero; and
adapting the mathematical model according to the model adaption signal.

5. The method of claim 1, wherein the signal indicative of an error source is indicative of one or more disturbances on the rotary steerable drilling system.

6. The method of claim 1, wherein the control input comprises a voltage or current value.

7. The method of claim 1, wherein the estimated output is a toolface angle.

8. A rotary steerable drilling system exhibiting a state, comprising:
a system simulator comprising a mathematical model of the rotary steerable drilling system, the mathematical model usable by a processing unit to generate an estimated output and an estimated state of the rotary steerable drilling system in response to a control input to the rotary steerable drilling system and without a sensing device in the rotary steerable drilling system to directly measure the state;
a simulator controller configured to receive an actual output of the rotary steerable drilling system and the estimated output from the system simulator, and, using the processing unit, generate an error compensation signal based on a difference between the actual output and the estimated output;
an error source detection module comprising a filter, comprising a low pass filter, a band pass filter and a high pass filter,
wherein the error source detection module is operable to receive the error compensation signal and, using the processing unit, detect one or more sources of error by applying the electronic filter to the error compensation signal,
wherein the filter passes a signal indicative of an error source,
wherein the low pass filter is used to identify mathematical modeling errors, the band pass filter is used to identify physical disturbances including stick slip and the high pass filter is used to identify high frequency noise and disturbances;
wherein the error compensation signal is an input to the mathematical model; and
wherein the rotary steerable drilling system is steerable by adjusting a toolface angle based on the estimated state.

9. The system of claim 8, wherein the system simulator is configured to generate the estimated output and the estimated state based on the input and the error compensation signal as inputs to the mathematical model.

10. The system of claim 8, wherein the error compensation signal is usable to drive the difference between the actual output and the estimated output towards zero.

11. The system of claim 8, wherein the one or more sources of error include at least one of a disturbance or a modeling error.

12. The system of claim 8, wherein the error source detection module is configured to, using the processing unit, detect one or more modeling errors and generate a corresponding model adaption signal, wherein the model adaption signal is usable to provide instructions for adjusting the mathematical model and drive the one or more modeling errors towards zero.

13. A rotary steerable drilling system with state estimation, comprising: a rotary steerable drilling tool configured to receive a control input and exhibit a sensed output and a state;
a processing unit providing:
a rotary steerable drilling tool simulator, wherein the rotary steerable drilling tool simulator comprises a mathematical model of the rotary steerable drilling tool, the rotary steerable drilling tool simulator configured to receive the control input and generate an estimated output and an estimated state of the rotary steerable drilling tool in response to the control input and without a sensing device in the rotary steerable drilling tool to directly measure the state; and
a simulator controller configured to receive the sensed output of the drilling tool and the estimated output from the drilling tool simulator, and generate an error compensation signal based on a difference between the sensed output and the estimated output;
wherein the rotary steerable drilling tool simulator is configured to receive the error compensation signal as an input to the mathematical model and generate the estimated output and the estimated state in response to the control input and the error compensation signal;
wherein the error compensation signal is configured to drive the difference between the sensed output and the estimated output towards zero and
wherein the processing unit further comprises a filter, comprising a low pass filter, a band pass filter and a high pass filter,
wherein the error source detection module is operable to receive the error compensation signal and, using the processing unit, detect one or more sources of error by applying the filter to the error compensation signal,
wherein the filter passes a signal indicative of an error source,
wherein the low pass filter is used to identify mathematical modeling errors, the band pass filter is used to identify physical disturbances including stick slip and the high pass filter is used to identify high frequency noise and disturbances; and
wherein the rotary steerable drilling system is steerable by adjusting a toolface angle of the rotary steerable drilling tool based on the estimated state.

14. The rotary steerable drilling system of claim 13, wherein the error source detection module is configured to detect a signal indicative of one or more modeling errors and generate a model adaption signal, wherein the model adaption signal is usable to provide instructions for adjusting the mathematical model and thereby drive the signal indicative of one or more modeling errors towards a null value.

15. The rotary steerable drilling system of claim 13, wherein the processing unit is coupled to the rotary steerable drilling tool.

* * * * *